United States Patent
Kim et al.

(10) Patent No.: US 8,417,034 B2
(45) Date of Patent: Apr. 9, 2013

(54) APPARATUS AND METHOD FOR SEPARATING FOREGROUND AND BACKGROUND

(75) Inventors: Kap Kee Kim, Daejeon (KR); Bon Woo Hwang, Daejeon (KR); Ji Hyung Lee, Daejeon (KR); Jin Seo Kim, Daejeon (KR); Seung Wook Lee, Daejeon (KR); Chang Woo Chu, Daejeon (KR); Ho Won Kim, Daejeon (KR); Bon Ki Koo, Daejeon (KR); Gil haeng Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 917 days.

(21) Appl. No.: 12/535,877

(22) Filed: Aug. 5, 2009

(65) Prior Publication Data
US 2010/0158372 A1 Jun. 24, 2010

(30) Foreign Application Priority Data
Dec. 22, 2008 (KR) ........................ 10-2008-0131666

(51) Int. Cl.
*G06K 9/34* (2006.01)

(52) U.S. Cl. ....................................... 382/173; 382/253

(58) Field of Classification Search .................. 382/162, 382/173, 232–253; 375/240.22; 358/464
See application file for complete search history.

(56) References Cited

U.S. PATENT DOCUMENTS

| | | | |
|---|---|---|---|
| 5,748,780 A * | 5/1998 | Stolfo | 382/232 |
| 7,885,463 B2 * | 2/2011 | Zhang et al. | 382/173 |
| 2007/0116356 A1 | 5/2007 | Gong et al. | |
| 2007/0237393 A1 | 10/2007 | Zhang et al. | |
| 2011/0142343 A1 * | 6/2011 | Kim et al. | 382/173 |

FOREIGN PATENT DOCUMENTS

| | | |
|---|---|---|
| JP | 2002-185782 | 6/2002 |
| JP | 2003-032688 | 1/2003 |
| KR | 10-2003-0002919 | 1/2003 |
| KR | 10-2003-0003506 | 1/2003 |
| KR | 10-2004-0092564 | 11/2004 |
| KR | 10-2008-0062520 | 7/2008 |

OTHER PUBLICATIONS

"Real-time foreground-background segmentation using codebook model," Kyungnam Kim et al., Real-Time Imaging, vol. 11, pp. 172-185, Mar. 31, 2005.

* cited by examiner

*Primary Examiner* — Ishrat I Sherali
(74) *Attorney, Agent, or Firm* — Staas & Halsey LLP

(57) ABSTRACT

Disclosed herein is an apparatus and method for separating a foreground and a background. The apparatus includes a background model creation unit for creating a code book including a plurality of code words in order to separate the foreground and the background, and a foreground/background separation unit for separating the foreground and the background using the created code book. The method includes the steps of creating a code book including a plurality of code words in order to separate the foreground and the background, rearranging the cord words of the created code book on the basis of the number of sample data that belong to each of the code words, and separating the foreground and the background using the code book.

18 Claims, 4 Drawing Sheets

APPARATUS AND METHOD FOR SEPARATING FOREGROUND AND BACKGROUND

CROSS-REFERENCE(S) TO RELATED APPLICATION(S)

The present invention claims priority of Korean Patent Application No. 10-2008-0131666, filed on Dec. 22, 2008, which is incorporated herein by reference.

FIELD OF THE INVENTION

The present invention relates to an apparatus and method for separating a foreground and a background; and, more particularly, to an apparatus and method for separating a foreground and a background by creating a code book including a plurality of code words.

BACKGROUND OF THE INVENTION

Conventional foreground and background separation technologies are configured to separate a foreground and a background by modeling a background using the brightness values of pixels. However, since a complicated background is not easy to model, the background is modeled using the Mixture of Gaussians (MOG) method. The MOG method is disadvantageous in that it is difficult to model a rapid change in background using a small number of Gaussians. In contrast, if in order to overcome this problem, the number of Gaussians is increased and the learning ratio is adjusted to the rapid change, another problem arises in that a slowly changing background is determined to be a foreground.

Furthermore, since the technology which is actually applied focuses on the speed, it creates a background model depending on whether a condition is fulfilled. In this case, when a background model is created, an elaborate model is not created and, an excessive number of models are created, so that many models must be searched through, thus resulting in a loss of time.

SUMMARY OF THE INVENTION

It is, therefore, an object of the present invention to provide an apparatus and method for separating a foreground and a background, which is capable of reducing excessive time used for the separation of the foreground and the-a background by creating an appropriate number of code words and is capable of improving the performance of the separation of the foreground and the background by performing elaborate code word modeling.

In accordance with an aspect of the present invention, there is provided an apparatus for separating a foreground and a background, comprising a background model creation unit for creating a code book, including a plurality of code words, in order to separate the foreground and the background; and a foreground/background separation unit for separating the foreground and the background using the created code book.

Preferably the background model creation unit may rearrange the code words of the created code book on the basis of a number of sample data belonging to each of the code words.

Preferably each of the code words may be a set of sample data clustered on the basis of similar color tones.

Preferably the sample data may be clustered using a K-means clustering method.

Preferably the code book may be created for the position of each pixel of a background image.

Preferably the background model creation unit may determine a distribution value of the sample data, select the appropriate number of code words on the basis of the determined value, and calculate a distance between a representative value of each of the code words and a representative value and brightness information of the sample data within the code word.

Preferably the distance between the representative value of each of the code words and the representative value may be a Euclidean distance.

Preferably the foreground/background separation unit may determine whether a sample exists within a corresponding code word by checking color tone and brightness of the sample.

Preferably the checking of the color tone may be performed on the basis of a distance between the sample and a center point of the corresponding code word.

Preferably the checking of the brightness may be performed in such a way that, when a difference in the brightness is greater than a specific probability value of a normal distribution, the sample is determined to be a background pixel, and, when a difference in the brightness is smaller than the specific probability value of the normal distribution, the sample is determined to be a foreground pixel.

In accordance with another aspect of the present invention, there is provided a method of separating a foreground and a background, comprising the steps of creating a code book, including a plurality of code words, in order to separate the foreground and the background; rearranging the cord words of the created code book on the basis of a number of sample data that belong to each of the code words; and separating the foreground and the background using the code book.

Preferably each of the code words may be a set of sample data clustered on the basis of similar color tones.

Preferably the sample data may be clustered using a K-means clustering method.

Preferably the code book may be created for the position of each pixel of a background image.

Preferably the step of creating the code book may include determining a distribution value of the sample data, selecting an appropriate number of code words on the basis of the determined value, and calculating a distance between a representative value of each of the code words and a representative value and brightness information of the sample data within the code word.

Preferably the distance between the representative value of each of the code words and the representative value may be a Euclidean distance.

Preferably the step of separating the foreground and the background may include determining whether a sample exists within the code word by checking color tone and brightness of the sample.

Preferably the checking of the color tone may be performed on the basis of a distance between the sample and a center point of the corresponding code word.

Preferably the checking of the brightness may be performed in such a way that, when a difference in the brightness is greater than a specific probability value of a normal distribution, the sample is determined to be a background pixel, and, when the difference in the brightness is smaller than the specific probability value of the normal distribution, the specific is determined to be a foreground pixel.

In accordance with the present invention, there are advantages in that the time taken to separate a foreground and a background can be reduced by creating an appropriate number of code words and the performance of the separation of a foreground and a background can be improved by performing elaborate code word modeling.

BRIEF DESCRIPTION OF THE DRAWINGS

The above and other objects and features of the present invention will become apparent from the following description of embodiments given in conjunction with the accompanying drawings, in which.

DETAILED DESCRIPTION OF THE EMBODIMENTS

Hereinafter, embodiments of the present invention will be described in detail with reference to the accompanying drawings. In the following description of the present invention, if it is determined that detailed descriptions of well-known functions or constructions may make the gist of the present invention unnecessarily unclear, the descriptions will be omitted. The following terms are defined considering the functions of the present invention, and may vary in accordance with the intention of a user or manager or a practice. Therefore, the terms must be defined on the basis of the overall context of the present specification.

Figure 1:
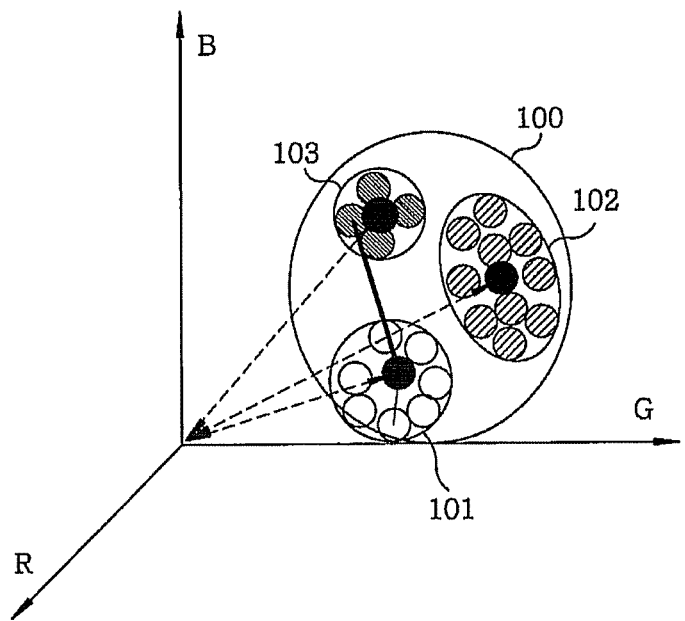
FIG. 1 shows a diagram showing a process of creating code words which is part of a process of creating a code book in accordance with the present invention.
Figure 2:
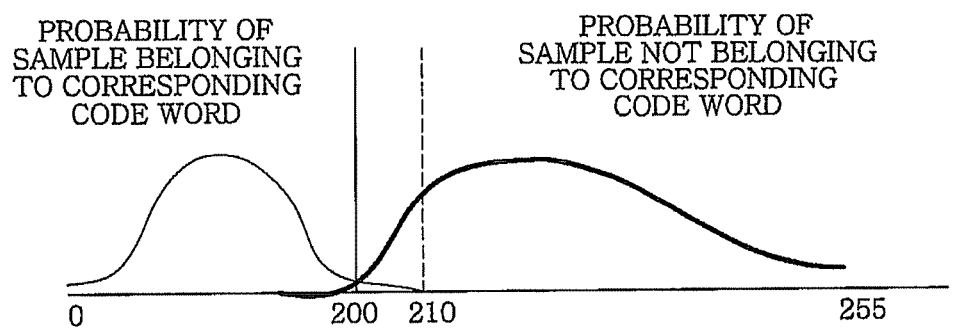
FIG. 2 describes a diagram showing the distribution of the distances to samples to be included in a specific code word and the distribution of the distances to samples not to be included in the code word.

FIG. 1 is a diagram showing a process of creating code words which is part of a process of constructing a code book in accordance with the present invention. FIG. 2 is a diagram showing the distribution of distances to samples to be included in a specific code word and the distribution of distances to samples not to be included in the specific code word. And FIG. 3 is a diagram showing an apparatus for separating a foreground and a background in accordance with the present invention.

Figure 3:
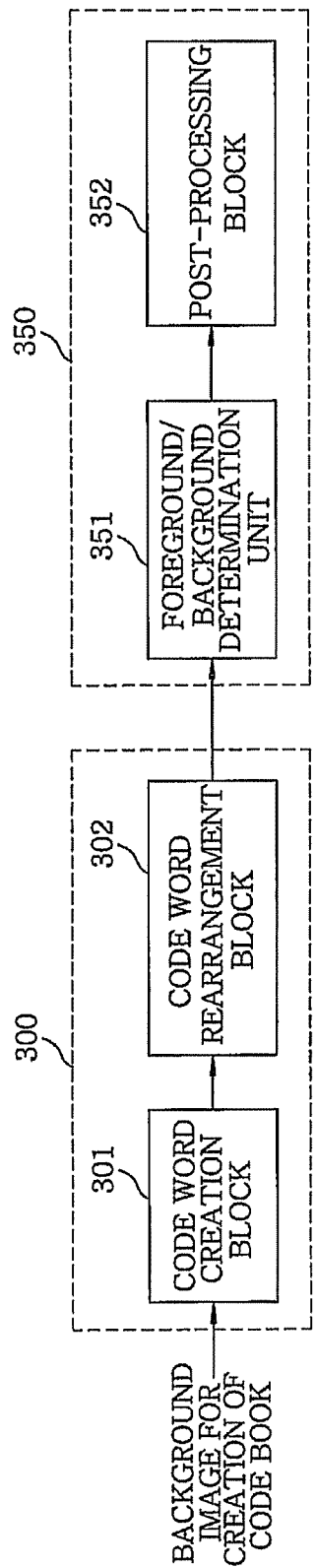
FIG. 3 illustrates a diagram showing an apparatus for separating a foreground and a background in accordance with the present invention.

Referring to FIGS. 1 to 3, the apparatus for separating a foreground and a background in accordance with the present invention includes a background model creation unit 300 and a foreground/background separation unit 350.

The background model creation unit 300 creates a code book, including a plurality of code words, in order to separate a foreground and a background. The background model creation unit 300 may include a code word creation block 301 and a code word rearrangement block 302.

The background model creation unit 300 creates a code book based on a position of each pixel of an inputted image. Referring to FIG. 1, a code book 100 includes a plurality of code words 101, 102 and 103. Each of the code words 101, 102 and 103 refers to a set of samples that are clustered on the basis of the similar color tones. The code word creation block 301 divide samples into clusters using the K-means clustering method, which is a clustering algorithm. The created clusters are the code words 101, 102 and 103, respectively. Each of the code words 101, 102 and 103 has a center point. Two distributions are acquired by measuring the distances between the center point and the samples of a corresponding code word and the distances between the center point and the samples of other code words. FIG. 2 shows these two distributions. Here, with regard to the two distributions, that is, a distribution obtained by measuring the distances between the center point of the corresponding code word and the samples inside the corresponding code word and a distribution obtained by measuring the distances between the center point of the corresponding code word and the samples outside the corresponding code word, the threshold value 200 of the probability of a sample belonging to the corresponding code word and a conservative threshold value 210 are set. If only one code word is created, the threshold value is set on the basis of a specific probability value by using the distribution of the code word. Furthermore, the average value, maximum value and minimum value of the brightness data of the samples distributed within the code word are also measured by using the distribution of the code word. A method of setting the threshold value may differ depending on quality of the image, which means that it may be determined by settling the degree of error toleration. If the minimization of the error tolerance is desired, the conservative threshold value 210 is used. The method of setting the threshold value may be determined in association with a post-processing scheme that is used by the foreground/background separation unit 350. Referring to FIG. 2, in the case where a post-processing scheme is used several times, the left portion of the threshold value located on the right side of the graph of FIG. 2 may be selected a lot. In the case where the use of post-processing scheme is minimized, the threshold value is set at an appropriate location, so that the right portion of the threshold value located on the left side of the graph of FIG. 2 and the left portion of the threshold value located on the right side of the graph of FIG. 2 are well balanced.

The code word rearrangement block 302 rearranges the code words of the created code book 100 on the basis of the number of pieces of sample data belonging to each of the code words 101, 102 and 103. It is assumed that the code word which includes a large number of samples has a high probability of constituting a background. Therefore, the efficiency of searching may be achieved by the rearranging the code words.

The foreground/background separation unit 350 separates a foreground and a background using the created code book 100. The foreground/background separation unit 350 may include a foreground/background determination unit 351 and a post-processing block 352. The foreground/background determination unit 351 uses the code book 100 and an image for separation as input. The foreground/background determination unit 351 reads each pixel-based code word value from the code book 100, and measures a Euclidean distance, which is the RGB space distance between the corresponding code word value and a current input pixel value. The measured distance is applied to the distributions of all code words. If a current input pixel is determined to be a point within the closest code word, the foreground/background determination unit 351 measures the brightness of the pixel and anallyzes the measured brightness based on the brightness distribution of the corresponding code word, thereby finally determining whether the pixel is a sample that belongs to the corresponding code word. When the probability that the pixel belongs to the corresponding code word is approved to be low, the foreground/background determination unit 351 determines whether the current input pixel belongs to the second closest code word by comparing the brightness of the pixel with the brightness distribution of the second closest code word. After analyzing the distance distribution between the current input pixel and the last code word (which is the farthest code word from the corresponding sample), if the current input pixel is determined to be outside of the code word, the foreground/background determination unit 351 determines that the pixel constitutes a foreground.

Since errors may be included in the determination of the foreground/background determination unit 351, the post-processing block 352 outputs a mask image in which a foreground and a background have been separated from each other using morphology-based post-processing (erosion and expansion operations) in order to remove the error. Since the action of the post-processing differs depending on the quality of an image, the sequence and number of erosion and expansion operations varies depending on the quality. As described above, the threshold value of the internal distance to the center point of the code word and the threshold value of the external distance to the center point of the code word in the background model creation unit 300 are set differently depending on the performance of the post-processing of the post-processing block 352.

Figure 4:
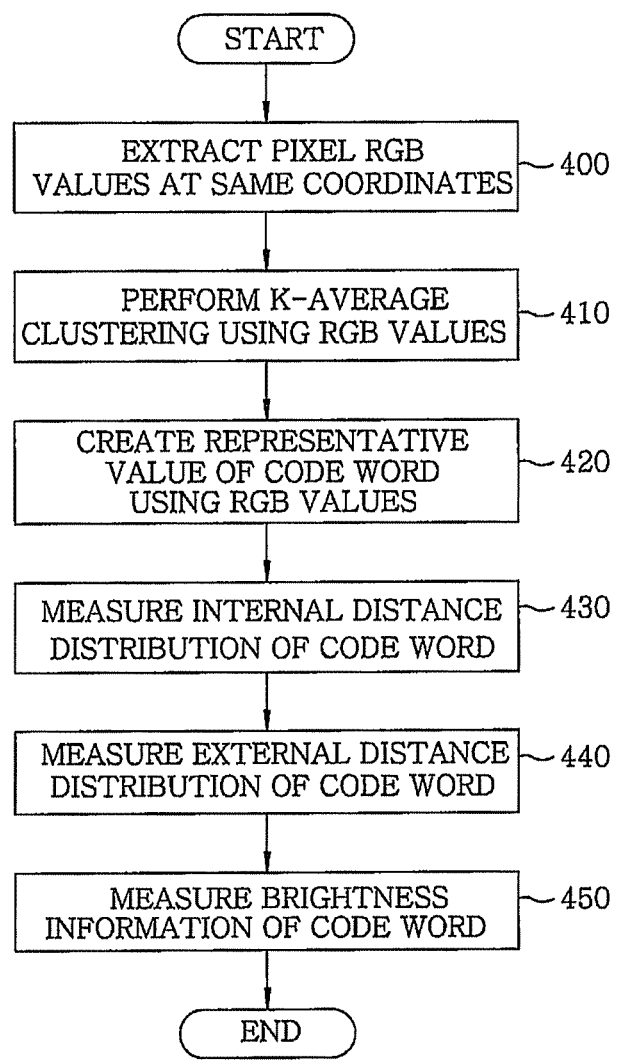
FIG. 4 offers a diagram showing a process of creating a code book which is part of a method of separating a foreground and a background in accordance with the present invention.

FIG. 4 is a diagram showing a process of creating a code book which is a part of the method of separating a foreground and a background in accordance with the present invention. Referring to FIGS. 3 and 4, the code word creation block 301 extracts RGB value of pixels at the same coordinates at step 400. The extracted RGB values are clustered using the K-means clustering algorithm at step 410, and the representative value of a code word is generated using the RGB values of the clustering results at step 420. After the representative value of the code word, which means the center point of the code word, has been determined, one distribution diagram is obtained by measuring the internal distance distribution of the code word on the basis of the representative value of the code word at step 430. Thereafter, another distribution diagram is obtained by measuring a external distance distribution of the code word on the basis of the representation value of the code word at step 440. Furthermore, the brightness information within the code word is measured at step 450. It is determined whether the current input pixel belongs to the specific code word using the code word, the internal distance distribution, the external distance distribution and the brightness information, which have been created as described above.

Figure 5:
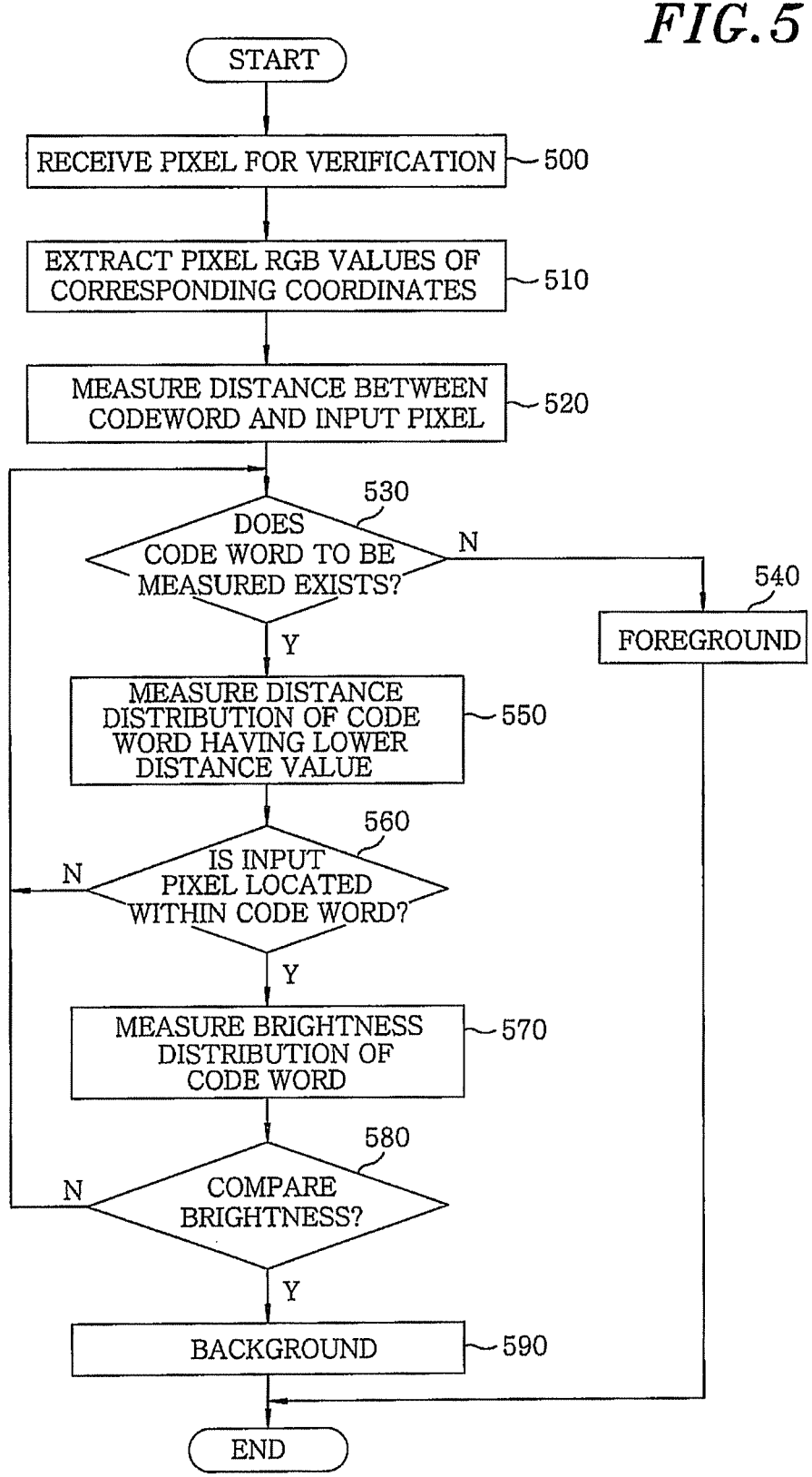
FIG. 5 shows a diagram showing a procedure for performing foreground/background separation in accordance with the present invention.

FIG. 5 is a diagram showing a procedure for performing foreground/background separation in accordance with the present invention. Referring to FIG. 5, the code word created in the process of FIG. 4 and a verification image used to separate a foreground and a background are received at step 500. RGB values at corresponding coordinates of the received verification image are extracted at step 510. The distance between the extracted pixel and the code word is measured at step 520. Here, the distance refers to a Euclidean distance. In this case, the distance distribution of a code word having a low distance value is first measured at step 550. It is determined whether the input pixel is located within the code word on the basis of the results of the measurement at step 560. If, as a result of the determination, the input pixel is determined to be within the code word, the brightness distribution of the code word is measured at step 570. Comparison with the brightness at the center point of the code word is performed at step 580. If, as a result of the comparison, the input pixel is determined to be within the code word at step 580, the input pixel is determined to be a background pixel at step 590. If at step 560 or 580, the input pixel is determined not to be within the code word, it is determined whether a further code word to be measured exists at step 530. If a further code word to be measured exists, the steps 550 to 590 are repeated.

If at step 530, a further code word to be measured is determined not to exist, it means that no code word includes the input pixel. Therefore the input pixel is determined to belong in the foreground at step 540.

The module, function blocks or means of the present embodiment may be implemented using various well-known elements, such as electronic circuits, integrated circuits and Application Specific Integrated Circuits (ASICs), and may be implemented using respective elements or in integrated form.

While the invention has been shown and described with respect to the embodiments, it will be understood by those skilled in the art that various changes and modifications may be made without departing from the scope of the invention as defined in the following claims.

What is claimed is:

1. An apparatus for separating a foreground and a background, comprising:
    a background model creation unit for creating a code book, including a plurality of code words, in order to separate the foreground and the background; and
    a foreground/background separation unit for separating the foreground and the background using the created code book,
    wherein the background model creation unit rearranges the code words of the created code book on the basis of the number of sample data belonging to each of the code words.

2. The apparatus of claim 1, wherein each of the code words is a set of sample data clustered on the basis of similar color tones.

3. The apparatus of claim 2, wherein the sample data are clustered using a K-means clustering method.

4. The apparatus of claim 1, wherein the code book is created based on a position of each pixel of a background image.

5. The apparatus of claim 1, wherein the background model creation unit selects an appropriate number of code words on a distribution, and calculates a representative value, a distance between the representative value of each of the code words and the sample data and brightness information of the sample data within the code word.

6. The apparatus of claim 5, wherein the distance between the representative value of each of the code words and the sample data is a Euclidean distance.

7. The apparatus of claim 1, wherein the foreground/background separation unit determines which code word a sample exists within by checking color tone and brightness of the sample.

8. The apparatus of claim 7, wherein the checking of the color tone is performed on the basis of a distance between the sample and each representative value of said each of the code words.

9. The apparatus of claim 7, wherein the checking of the brightness is performed in such a way that, when a difference in the brightness is greater than a specific probability value of a normal distribution, the sample is determined to be a background pixel, and, when a difference in the brightness is smaller than the specific probability value of the normal distribution, the sample is determined to be a foreground pixel.

10. A method of separating a foreground and a background, comprising:
    creating a code book, including a plurality of code words, in order to separate the foreground and the background;

rearranging the code words of the created code book on the basis of a number of sample data that belong to each of the code words; and separating the foreground and the background using the code book.

11. The method of claim 10, wherein each of the code words is a set of sample data clustered on the basis of similar color tones.

12. The method of claim 11, wherein the sample data are clustered using a K-means clustering method.

13. The method of claim 10, wherein the code book is created based on a position of each pixel of a background image.

14. The method of claim 10, wherein said creating the code book comprises determining a distribution of the sample data, selecting an appropriate number of code words on the basis of the determined distribution, and calculating a representative value, a distance between the representative value of each of the code words and the sample data and brightness information of the sample data within the code word.

15. The method of claim 14, wherein the distance between the representative value of each of the code words and the sample data is a Euclidean distance.

16. The method of claim 10, wherein said separating the foreground and the background comprises determining which code word a sample exists within by checking color tone and brightness of the sample.

17. The method of claim 16, wherein the checking of the color tone is performed on the basis of a distance between the sample and each representative value of said each of the code words.

18. The method of claim 16, wherein the checking of the brightness is performed in such a way that, when a difference in the brightness is greater than a specific probability value of a normal distribution, the sample is determined to be a background pixel, and, when a difference in the brightness is smaller than the specific probability value of the normal distribution, the specific is determined to be a foreground pixel.

* * * * *